United States Patent [19]

Veron

[11] 3,892,317
[45] July 1, 1975

[54] HORIZONTAL MANIPULATION ARM
[75] Inventor: Bernard Veron, Savigny Sur Orge, France
[73] Assignee: Groupement pour les Activities Atomiques et Avancees, LePlessis Robinson, France
[22] Filed: June 19, 1974
[21] Appl. No.: 480,773

[30] Foreign Application Priority Data
June 29, 1973 France .............. 73.23976

[52] U.S. Cl. .............. 214/1 BC; 214/1 BH
[51] Int. Cl. ............................. B66c 1/10
[58] Field of Search...... 214/1 BC, 1 BD, 1 B, 1 BS, 214/1 BH, 1 BV, 147 T

[56] References Cited
UNITED STATES PATENTS
3,757,963   9/1973   Binkley .............. 214/1 BC X FOREIGN PATENTS OR APPLICATIONS
663,074   8/1965   Belgium ............ 214/1 BC Primary Examiner—Robert J. Spar
Assistant Examiner—George F. Abraham
Attorney, Agent, or Firm—Sughrue, Rothwell, Mion, Zinn & Macpeak

[57] ABSTRACT

Horizontal manipulation arm enabling the transferring of a part in a horizontal plane of a work unit to a certain number of work units spaced out round the mechanism. That arm comprises a vertical column on which a sleeve bearing a connecting rod fixed by one of its ends on the said sleeve and bearing, at the other end, the prehension element, may slide and rotate.

6 Claims, 7 Drawing Figures

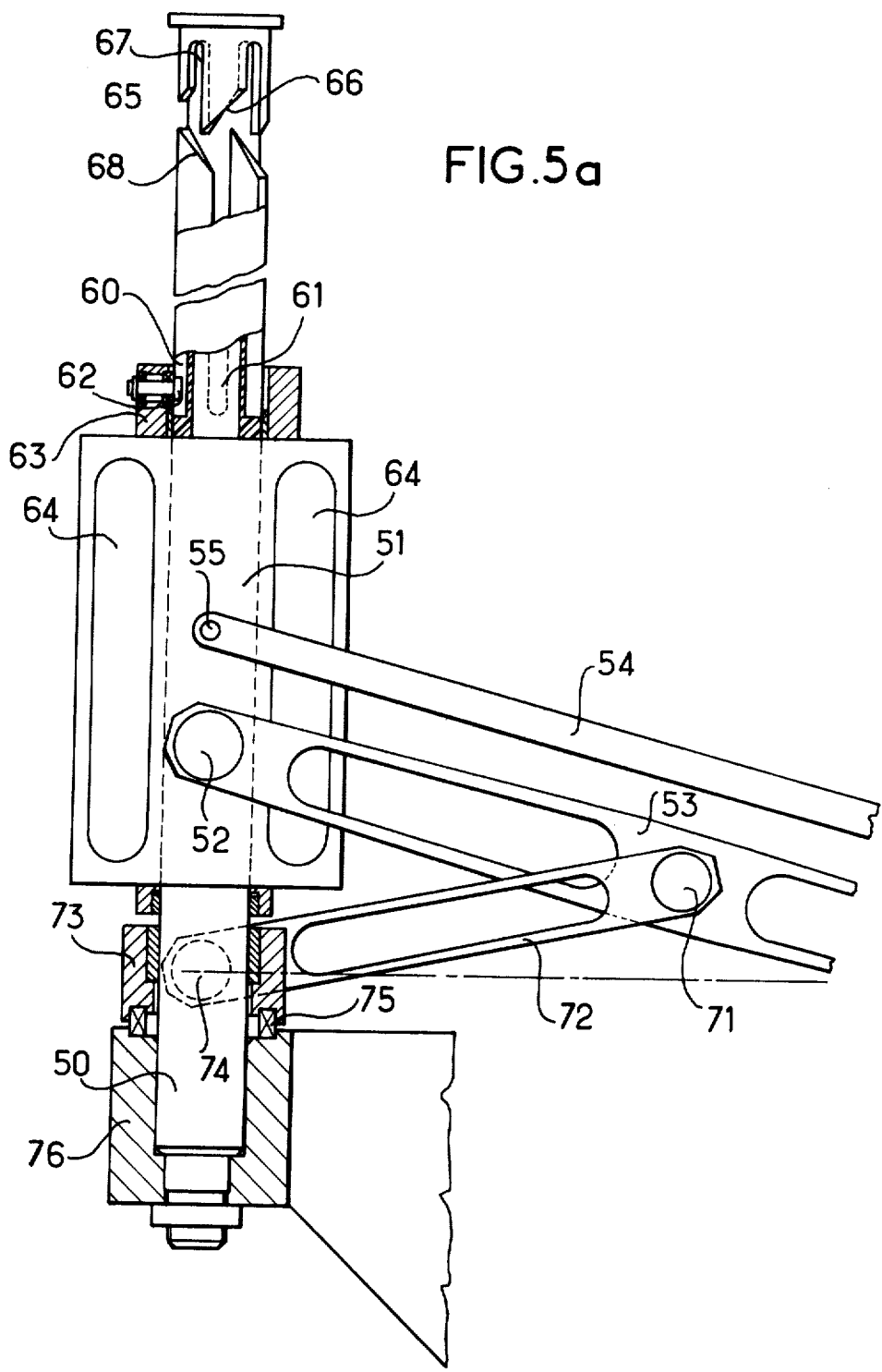

HORIZONTAL MANIPULATION ARM

BACKGROUND AND SUMMARY OF THE INVENTION

The present invention concerns a horizontal manipulation arm.

The automation of tasks in industrial firms leads to the designing of devices which are unceasingly more specialized, meeting very precise requirements. It thus appeared necessary to have available a manipulation arm making it possible to distribute rapidly in a horizontal plane a part held by a clamp at a chosen work unit between a certain number of work units distributed in a substantially equal manner about the mechanism.

A first analysis of the movements shows immediately that before passing from one work unit to another, the arm must be retracted; failing this, it would sweep, on its passage, all the elements placed at a certain level. When it passes from one work unit to another, such an arm must therefore undergo at least the following 3 operations:

retraction maintaining the part in a horizontal plane, rotation about a vertical axis,
horizontal elongation in the direction of the new work unit to be reached.

Certainly, there exist various devices enabling an object, a clamp, for example, to move horizontally in a radial direction in relation to a vertical axis. In these known devices, there is a rod and a connecting link whose length is half that of the rod articulated together in the middle of the rod, one end of the latter being restricted to move on the vertical line passing through the centre of rotation of the said connecting link.

Moreover, numerous devices in which a clamp connected to a vertical axis can slide or turn freely in relation to the latter are also known; in this way, it may appear easy to combine a rotating movement and a radial linear movement. In fact, it is necessary to design a mechanism enabling an automatic sequential execution of the three above-mentioned movements: horizontal and radial retraction of the arm bearing the clamp, rotation through a determined angle, horizontal and radial extension of the arm bearing the clamp.

The manipulation arm which is the object of the present invention enables an easy effecting of these three movements, thus making the automation thereof easy.

The object of the invention is therefore a horizontal manipulation arm comprising essentially:

a vertical column having a circular cross-section, bearing the device as a whole;
a sleeve which may slide along the vertical column and rotate on itself;
means for driving the sleev along the vertical columns;
a connecting rod connected, at one of its ends, to the said sleeve and supporting, at the other end, a prehension means;
a link whose length is equal to half that of the connecting rod, one of whose ends is connected to a fixed point of the vertical column and whose other end is connected to the middle of the connecting rod;
a roller fast with the sleeve sliding in a groove of the column, characterized in that the roller fast with the sleeve is obliged to follow, at the top of its path of travel, a helical ramp driving the manipulation arm in a rotating movement through a predetermined angle about the axis of the column.

BRIEF DESCRIPTION OF THE DRAWINGS

The present invention will be better understood on referring to the accompanying drawings, in which:

FIGS. 5a and 5b show respective ends as a vertical view of an example of the embodiment of the present invention of FIGS. 1 and 2;

DETAILED DESCRIPTION OF THE INVENTION

Figure 1:
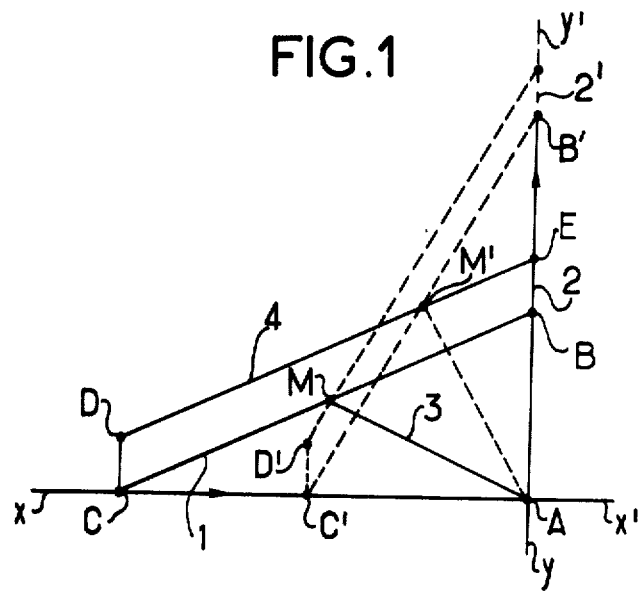
FIG. 1 describes diagrammatically the kinetics of the retracting movement of the arm in one form of the invention.

On referring to FIG. 1, it will be observed that the connecting rod 1, forming the arm BC is connected to the sleeve 2 and slides along the vertical column diagrammatically shown by the vertical axis yy'.

The link 3 is fixed on the one hand at a point A connected to the vertical column (which is hence mobile) and on the other hand at M, which is the middle of the main connecting rod 1. The result of this is that the free end of the connecting rod describes the axis xx' when the sleeve 2 slides along the axis yy'.

Indeed, at all moments, it may be considered that the triangle ABC formed by the 2 axes xx', yy' and by the connecting rod 2 is drawn in a circle of which the connecting rod is a diameter; the angle of xx' and of yy' is there fore at all times a right angle. If the connecting rod 1 is reinforced by a parallel bar 4 having the same length DE, it will be seen that the bar DE and the connecting rod BC form a parallelogram. As the points of the connecting rod 2 and of the bar 4 connected to the sleeve describe a vertical line along yy', CD remains constantly vertical.

When the sleeve is raised along the column, the sleeve 2 comes to 2'.

A roller fast with the sleeve moves in a spline of the column. That spline follows a generating line of that column and the rising movement of the bar is effected in a vertical plane. In this way, the connecting rod 2 remains in the vertical plane during the retracting.

Figure 2:
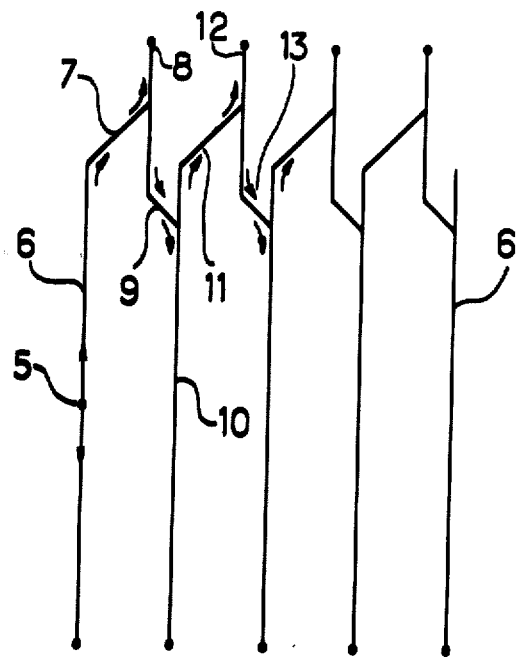
FIG. 2 shows diagrammatically the rotating movement effected at the top of the path of travel of the roller.

FIG. 2 makes it possible to understand easily the rotating movement of the arm: at the end of the rising, the roller 5 which followed the vertical spline 6 is driven along a ramp 7 which brings it to the point 8 when the connecting rod is completely closed again.

When the arm opens, the roller falls again and follows the spline coming from the point 8, then the ramp 9. When the roller 5 continues its path of travel, it now follows a new vertical spline 10 parallel to the spline 6 from which it is spaced apart by a predetermined angle corresponding to the rotation undergone by the arm.

When the arm is again closed, the roller 5 will follow the path 10, 11 12 and 13, so that if will not return backwards to the starting position. To return to the starting position on the spline 6, it is necessary to go through the whole cycle of movements provided for. Such kinetics to the rotation movements form an advantage each time the arm is to be obliged to follow a rigid cycle.

In other cases, it is preferable to be able, if required, to return to the preceding position. These cases are diagrammatically described in FIGS. 3 and 4.

Figure 3:
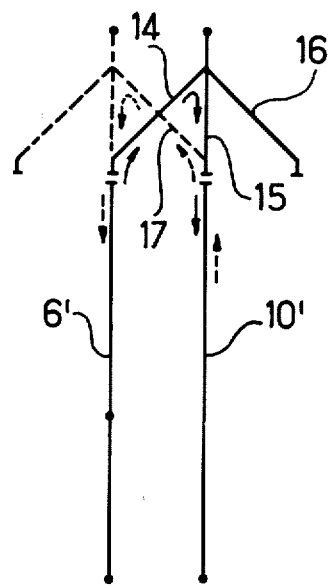
FIG. 3 shows another type of rotating movement by a modified arm of the invention.

In FIG. 3, the ramps situated at the top part of the vertical column are mounted on a drum which is capable of rotating in relation to the vertical column and connected to the axis of the latter. When that drum takes up the position corresponding to the continuous line, the roller leaving the vertical spline 6' reaches the ramp 14, from which it comes down when the arm stretches again, by the spline 15 which is placed facing the vertical spline 10 corresponding to the neighbouring work unit. If it is required to return to the preceding work unit, the ramp 16 is made to take up the position 17 shown in discontinuous lines on the drawing, by a rotation of the drum and finally the roller returns to the spline 6'.

Figure 4:
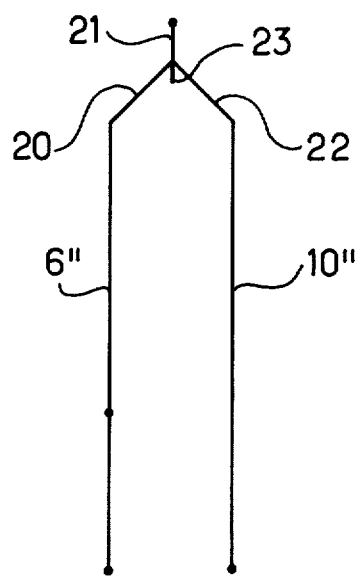
FIG. 4 shows diagrammatically a type of rotating movement by a further modified form of the invention.

FIG. 4 shows a controlled needle device which is a great advantage when the movement between two neighbouring work units is very frequent. To make the roller pass from the splin 6'' to the splin 10'', a ramp traced on a drum may, as previously, be used. When the arm closes, the roller leaves the spline 6' to engage along the ramp 20 and will, at the end of its path of travel, reach the ramp 21. When the roller begins to fall again subsequent to the beginning of the extending of the arm, it will reach the intersection of the ramps 20 and 22. A needle 23 previously controlled, will direct the roller in the required direction.

Figure 5B:
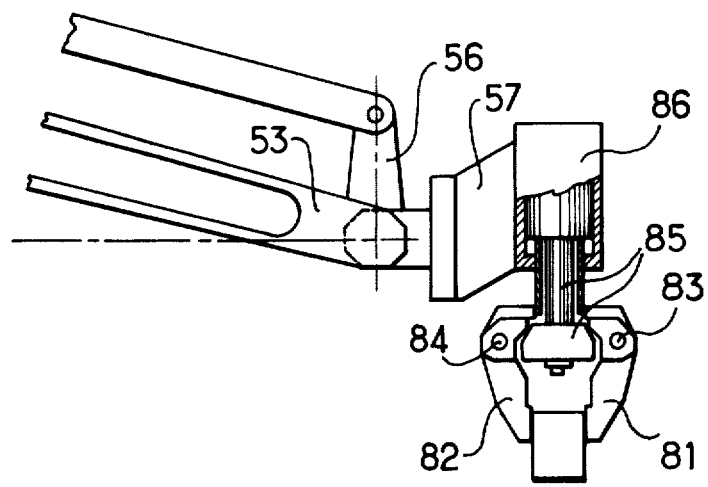

FIG. 5 composed of sections 5a and 5b is a profile view of a horizontal manipulation arm according to the invention. The vertical column may be distinguished at 50. The sleeve 51, which may be moved to adjust its height and direction in relation to the vertical column may be seen on that column 50. Connected by a pivot 52, the connecting rod 53 supports rigidly the clamp 57. (FIG. 5b). The connecting rod 53 is reinforced by a lighter connecting rod 54 bearing against the sleeve 51 by a pivot 55 arranged exactly vertical to the pivot 52. The ends of the connecting rods 53 and 54 are connected together by a link 56 (FIG. 5b) whose length is equal to the distance between the two pivots 52 and 55. The link 56 therefore permanently keeps a vertical position forcing the clamp 57 to remain, in its turn, vertical.

A certain number of vertical splines such as 60 and 61 are traced on the column 50; a roller 62 held by a roller support 63 fast with the sleeve 51 ensures a vertical trajectory for the latter when it is set in motion under the action of a linear motor 64. The spline 60 is extended at its upper part by a cam 65 inclined like the cam 66. When the roller 62 reaches the cam 65, it lifts it and continues its path of travel along the spline 67. This causes a rotation of the sleeve 51 with which the roller 62 is fast.

The completely folded back arm will extend; the roller 62 then bears against the cam 68 and, then, it returns to the cam 61 corresponding to the predetermined rotation provided for the horizontal manipulation arm.

The movement of the clamp is effected permanently in a horizontal plane, since the middle 71 of the connecting rod 53 is connected to the base of the vertical column 50 by a link 72 whose length is half that of the connecting rod 53. That link 72 is attached to the vertical column 50 through a ring 73 to which it is longitudinally fixed on the column by a pivot 74. The ring turns due to a bearing 75 on a fixed support 76.

Figure 6:
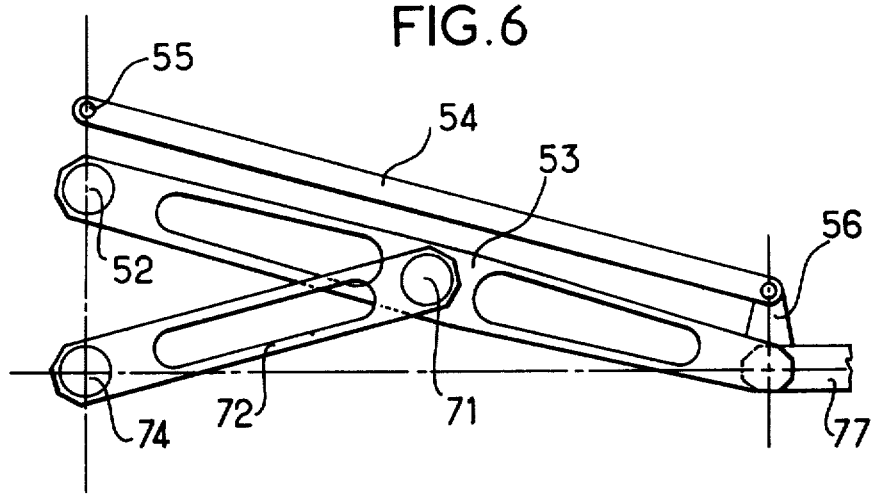
FIG. 6 is a vertical view of the elements forming the kinematics of the retraction of the arm of FIGS. 5a and 5b.

The horizontal movement of the arm can very easily be understood on referring to FIG. 6, which illustrated, moreover, the diagram in FIG. 1. The point 74 is longitudinally fixed relative to the column. The points 55 and 52 describe a vertical line. The free end 77 of the connecting rod 53 describes a plane horizontal trajectory.

The clamp 57 comprises two jaws 81 and 82, pivoting about the axes 83 and 84; these jaws are controlled by a jack 85. The clamps may, moreover, be driven in a vertical movement over a certain length comprised, in general, between 50 and 100 millimetres by means of a jack 86. In this way, the manipulation arm arriving slightly above a part to be drawn away, stops, the jack 85 controls the lowering of the tongs; when the contact is established by the part, the jack 85 closes the clamp; the jack 86 brings the clamp back to the original position. By a horizontal movement, the clamp is brought close to the vertical column 50; the rotation through a predetermined angle is effected; the arm can again extend and bring the part borne by the clamp to its new position.

Such a manipulation arm is capable of being put to various applications more particularly in smelting.

In any cases, it can ensure the transfer between several milling machines performing different and successive operations.

Likewise, a use may be found for it for the removal and checking of parts on a milling line.

What is claimed is:

1. Horizontal manipulation arm (1) ensuring the passing, by retraction, rotation and extension of the said arm, from one work unit to another, comprising essentially:

a fixed, vertical column (50) having a circular cross-section, a sleeve (51) slidable along the vertical column (50) and rotatable thereabout, means (64) for driving the sleeve in a linear movement along the vertical column, a connecting rod (53), connected, at one of its ends, to said sleeve and supporting, at the other end, a prehension means (57), a link (72) whose length is equal to half that of the connecting rod (53) having one of its ends pivotably connected at a point (74) by means rotatably about but longitudinally fixed on the vertical column and the other end pivotably connected to the middle of the connecting rod (53), vertical groove means 6 on said column (50), a roller (62) movable with the sleeve (51) and slidable within said groove means (6) of the vertical column, and helical ramp means (7, 9, 11, 13) joined to one end of said groove means so as to guide the manipulation arm (1) in a rotating movement through a predetermined angle about the axis (yy') of the column (50) as the sleeve is slid therealong.

2. Horizontal manipulation arm according to claim 1, wherein said ramp means comprise successive circumferentially spaced helical ramps (7, 9, 11), ensuring the rotation of the arm through a predetermined angle carried by the upper part of the vertical column (50).

3. Horizontal manipulation arm according to claim 1, wherein said ramp means comprise successive helical ramps (14, 16) ensuring the rotation of the arm, traced on a drum supported by the axis of the vertical column (50).

4. Horizontal manipulation arm according to claim 3, wherein a control needle (23) is placed at the intersection of two ascending ramps (20 and 22) traced on said drum.

5. Horizontal manipulation arm according to claim 1 wherein the drive motor for moving the sleeve (2) along the vertical column (50) is a linear motor.

6. Manipulation arm according to claim 5, wherein said prehension means is constituted by a clamp (57) the closing of which is controlled by a jack (85).

* * * * *